A. M. BARKER.
HORSE-DETACHER.
No. 180,825. Patented Aug. 8, 1876.
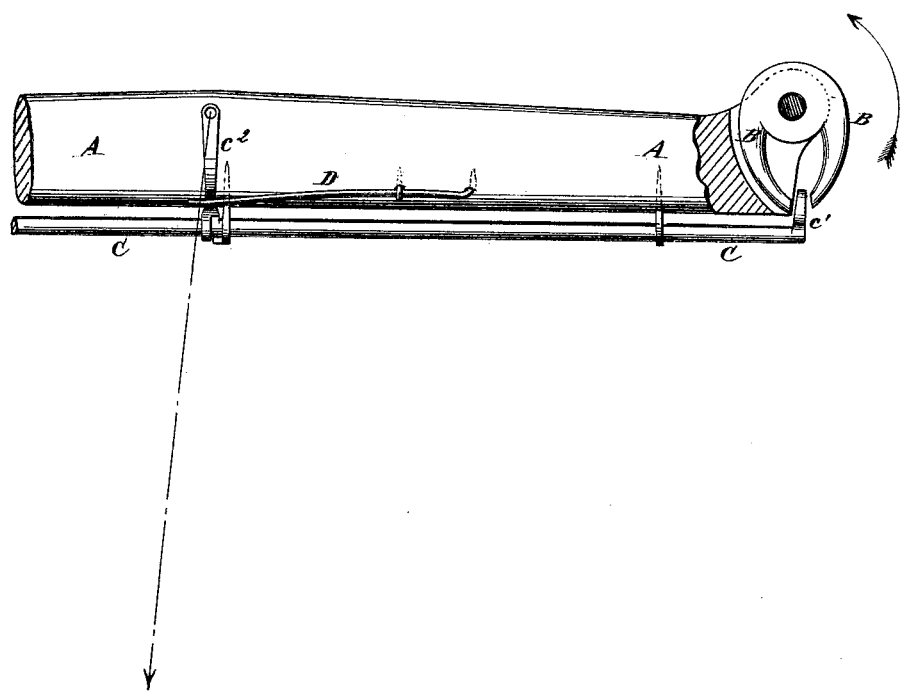
WITNESSES:
N. W. Almqvist
John Goethals
INVENTOR:
A. M. Barker
BY
Munn
ATTORNEYS.

UNITED STATES PATENT OFFICE.

AMOS M. BARKER, OF MACON, NEBRASKA.

IMPROVEMENT IN HORSE-DETACHERS.

Specification forming part of Letters Patent No. 180,825, dated August 8, 1876; application filed May 9, 1876.

*To all whom it may concern:*

Be it known that I, AMOS M. BARKER, of Macon, in the county of Franklin and State of Nebraska, have invented a new and useful Improvement in Horse-Detachers, of which the following is a specification:

The figure is a top view of a part of a whiffletree to which my improvement has been applied, part being broken away to show the construction.

The invention is an improvement in the class of detaching apparatus consisting, in general terms, of a rock-shaft secured to a whiffletree, and adapted to be operated by means of a strap to allow the disengagement of the traces from the whiffletree, and thus release the horse from the vehicle.

The improvement relates to the combination of a rock-shaft and pivoted two-pronged trace-hook with the whiffletree, the construction, arrangement, and operation being as hereinafter described.

A represents a whiffletree, the ends of which are slotted, and have lugs formed upon them, projecting outward and forward. Or the lugs may be formed upon ferrules attached to the ends of the whiffletree. B is a double hook, the center or base of which is pivoted to and between the lugs of the ends of the whiffletree. The ends of the double hook B project toward each other, and are at such a distance apart that the cock-eye or end of the tug may be passed between them. C is a rod extending along the rear side of the whiffletree A, and working in staples or other keepers attached to it. Upon the forward side of the ends of the rod C are formed heads $c^1$, of such a size that when turned between the ends of the double hook B the tug cannot get off said hook. To the center of the rod C is rigidly attached an arm, $c^2$, which projects forward over the upper side of the whiffletree A, and is so formed as to fit upon said whiffletree. The arm $c^2$ is held down upon the whiffletree A by a spring, D, which rests upon it, and is attached to said whiffletree. If desired, two springs, D, may be used, being connected with the whiffletree A and rod C near their ends. The arm $c^2$ is designed to have a cord attached to it extending back to the vehicle, and secured in such a place that it may be conveniently reached and operated by the driver.

In using the device the double hook B is turned back into the position shown in the figure, the cock-eye of the tug is put over its outer arm, and the head $c^1$ of the rod C is placed in the space between the points of the said double hook, holding the hook securely in place. Should it become necessary to detach the horse, the driver pulls upon the cord attached to the arm $c^2$ of the rod C. This turns the rod C and raises its head $c^1$ out of the space between the points of the double hook B, when the draft-strain turns the hook B forward, draws the tug from the said hook B, and the horse is detached.

Having thus described my invention, what I claim as new, and desire to secure by Letters Patent, is—

In combination with the whiffletree A, the two-pronged trace-hook B, pivoted thereto, as shown, and the rock-shaft C, provided with the head $c^1$, for entering the space between the ends of the prongs of the hook, as and for the purpose specified.

AMOS M. BARKER.

Witnesses:
A. M. GARRETT,
W. H. AUSTIN.